United States Patent
Caldwell

[11] 3,929,160
[45] Dec. 30, 1975

[54] DIFFERENTIAL PRESSURE OPERATED PILOT RELAY AND SYSTEM AND DIVERTING RELAY CONSTRUCTION UTILIZING THE SAME OR THE LIKE

[75] Inventor: Edward N. Caldwell, Knoxville, Tenn.

[73] Assignee: Robertshaw Controls Company, Richmond, Va.

[22] Filed: Feb. 21, 1975

[21] Appl. No.: 551,624

Related U.S. Application Data

[63] Continuation-in-part of Ser. No. 405,132, Oct. 10, 1973.

[52] U.S. Cl. .............................................. 137/625.5
[51] Int. Cl.² ......................................... G05D 23/00
[58] Field of Search ..... 251/29, 75; 137/458, 625.5; 236/47

[56] References Cited
UNITED STATES PATENTS 3,749,306   7/1973   Mott et al. ............................. 236/47

*Primary Examiner*—Henry T. Klinksiek
*Attorney, Agent, or Firm*—Candor, Candor & Tassone

[57] ABSTRACT

A differential pressure operated pilot relay having an outlet for sending a pneumatic pilot output when the pilot relay receives a pneumatic signal of a certain magnitude, the pilot relay having a pneumatic selector for selecting within limits the magnitude of the pneumatic signal that is required for the pilot relay to produce the pneumatic pilot output. The pilot relay terminates the pneumatic pilot output when the pneumatic signal falls to another certain magnitude, the other certain magnitude being a fixed differential from the selected magnitude thereof. When utilized in a pneumatic control system along with a diverting valve, the pneumatic output from the pilot relay will switch the diverting valve from one operating condition thereof to another operating condition thereof with a snap action and when the pilot output is terminated, the diverting valve switches back from the other operating condition thereof to the one operating condition thereof with a snap action, such snap action being without regard to the rate of change of the input signal.

40 Claims, 7 Drawing Figures

DIFFERENTIAL PRESSURE OPERATED PILOT RELAY AND SYSTEM AND DIVERTING RELAY CONSTRUCTION UTILIZING THE SAME OR THE LIKE

This application is a Continuation-in-Part application of its copending parent patent application, Ser. No. 405,132, filed Oct. 10, 1973.

This invention relates to an improved differential pressure operated pilot valve means as well as to a pneumatically operated control system and pneumatically operated diverting relay construction utilizing such a pilot relay means or the like.

In particular, one of the features of the invention of the aforementioned parent application is to provide a pilot relay means which will produce a pneumatic pilot output when the pilot relay means receives a pneumatic signal of a certain magnitude and will thereafter terminate that pneumatic pilot output when the pneumatic signal thereto falls to another certain magnitude, the other certain magnitude being a fixed differential from the certain magnitude.

In this manner, the pilot relay means can have means for selecting within limits the magnitude of the pneumatic signal that is required to cause the pilot relay means to produce the pneumatic pilot output. However, the pneumatic signal must fall to another magnitude for terminating the pneumatic pilot output and that other magnitude is a fixed differential from the selected magnitude thereof.

It is a feature of this invention to provide a differential pressure operated pilot relay means of the above type.

For example, one embodiment of this invention provides a pneumatically operated diverting relay construction having a differential pressure operated pilot relay means and a diverting valve means operatively associated together, the pilot relay means having means for sending a pneumatic pilot output to the diverting valve means to switch the diverting valve means from one condition thereof to another condition thereof when the pilot relay means receives a pneumatic signal of a certain magnitude. The pilot relay means has pneumatic means for selecting within limits the magnitude of the pneumatic signal that is required for the pilot relay means to produce the pneumatic pilot output for switching the diverting valve means from the condition thereof to the other condition thereof. The pilot relay means has means for terminating the pneumatic pilot output to cause the diverting valve means to switch from the other condition thereof back to the one condition thereof when the pneumatic signal falls to another certain magnitude, the last-named means causing the other certain magnitude to be a fixed differential from the selected magnitude thereof.

The switching of the diverting valve means takes place with substantially a snap action of the diverting valve means, such snap action being without regard to the rate of change of the input signal.

Accordingly, it is an object of this invention to provide an improved differential pressure operated pilot relay means having one or more of the novel features set forth above or hereinafter shown or described.

Another object of this invention is to provide an improved pneumatically operated diverting relay construction having one or more of the novel features set forth above or hereinafter shown or described.

Another object of this invention is to provide an improved pneumatically operated control system having one or more of the novel features set forth above or hereinafter shown or described.

Other objects, uses and advantages of this invention are apparent from a reading of this description, which proceeds with reference to the accompanying drawings forming a part thereof and wherein.

Figure 1:
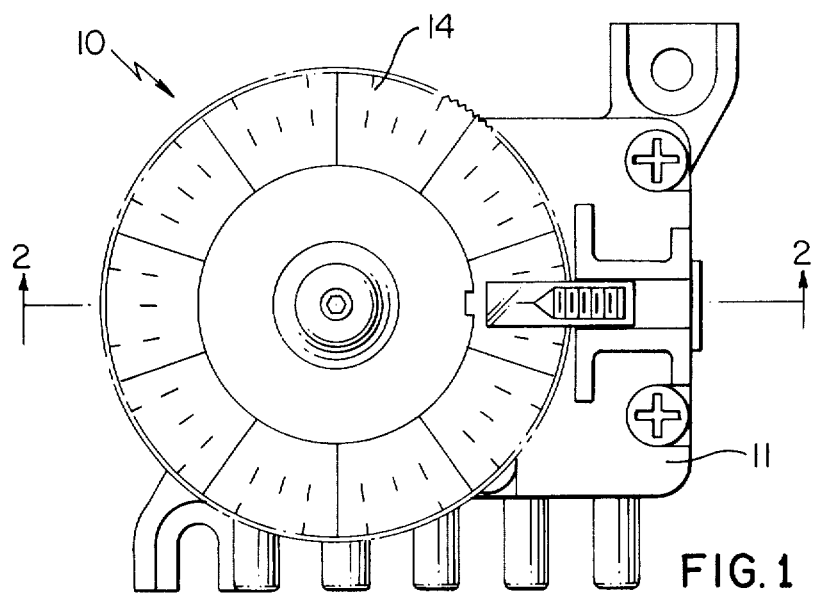
FIG. 1 is a top view of the improved diverting relay construction of this invention.

While the various features of this invention are hereinafter described and illustrated as being particularly adapted for providing a pneumatically operated control system that operates with pressurized air, it is to be understood that the various features of this invention can be utilized singly or in any combination thereof to provide a control system to be operated by other fluids whether the same be above or below atmospheric pressure.

Therefore, this invention is not to be limited to only the embodiment illustrated in the drawings, because the drawings are merely utilized to illustrate one of the wide variety of uses of this invention.

Figure 2:
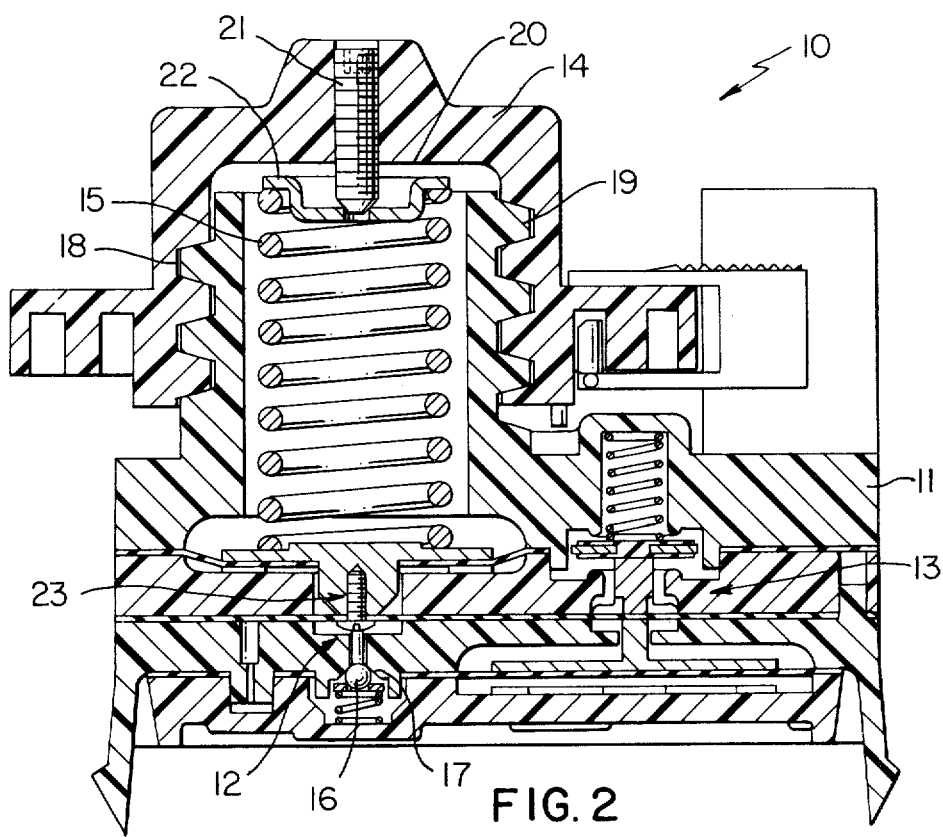
FIG. 2 is an enlarged, cross-sectional view taken on line 2—2 of FIG. 1.
Figure 3:
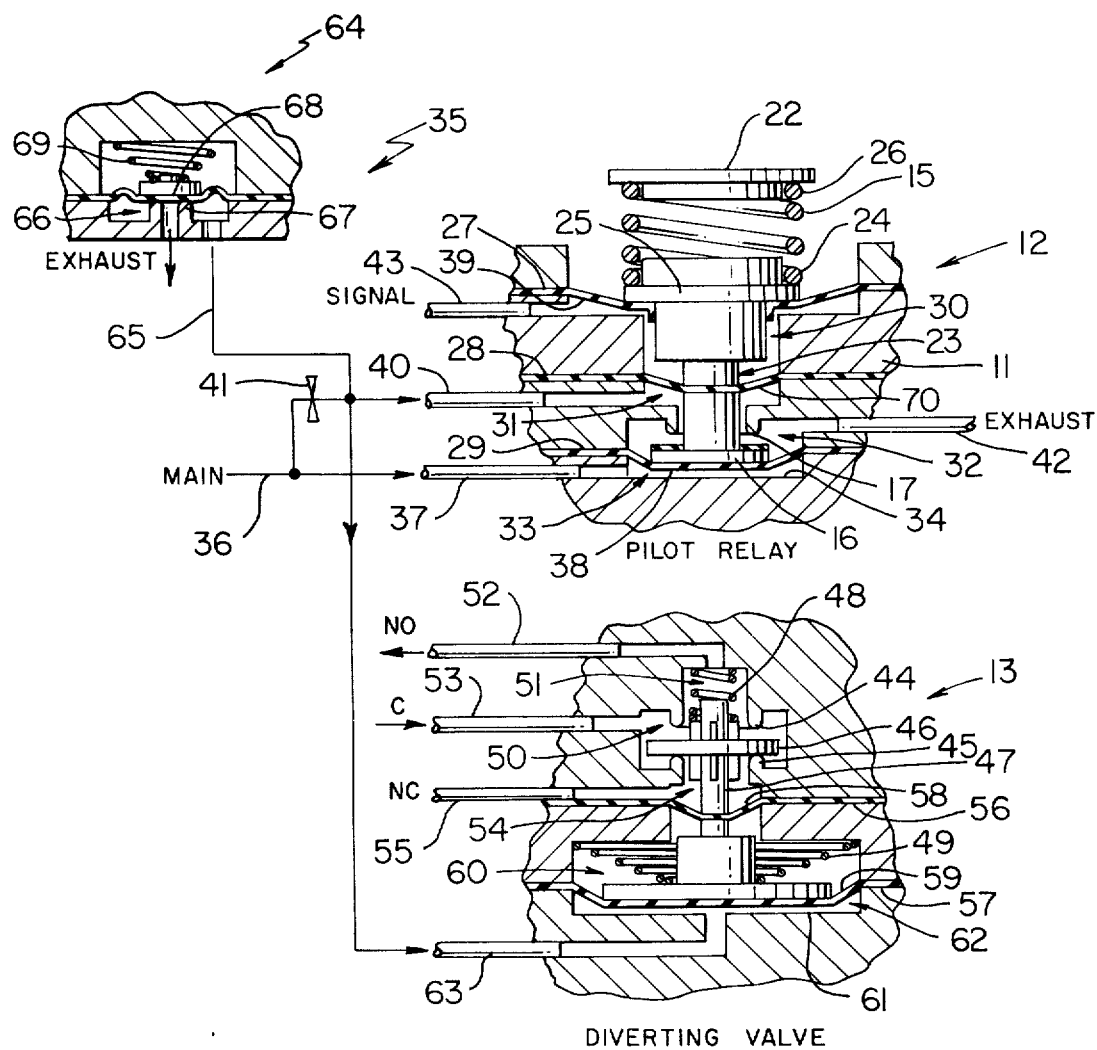
FIG. 3 is a schematic view illustrating the diverting relay construction of FIGS. 1 and 2 being utilized in the pneumatically operated control system of this invention, the diverting relay construction being in one operating condition thereof.
Figure 4:
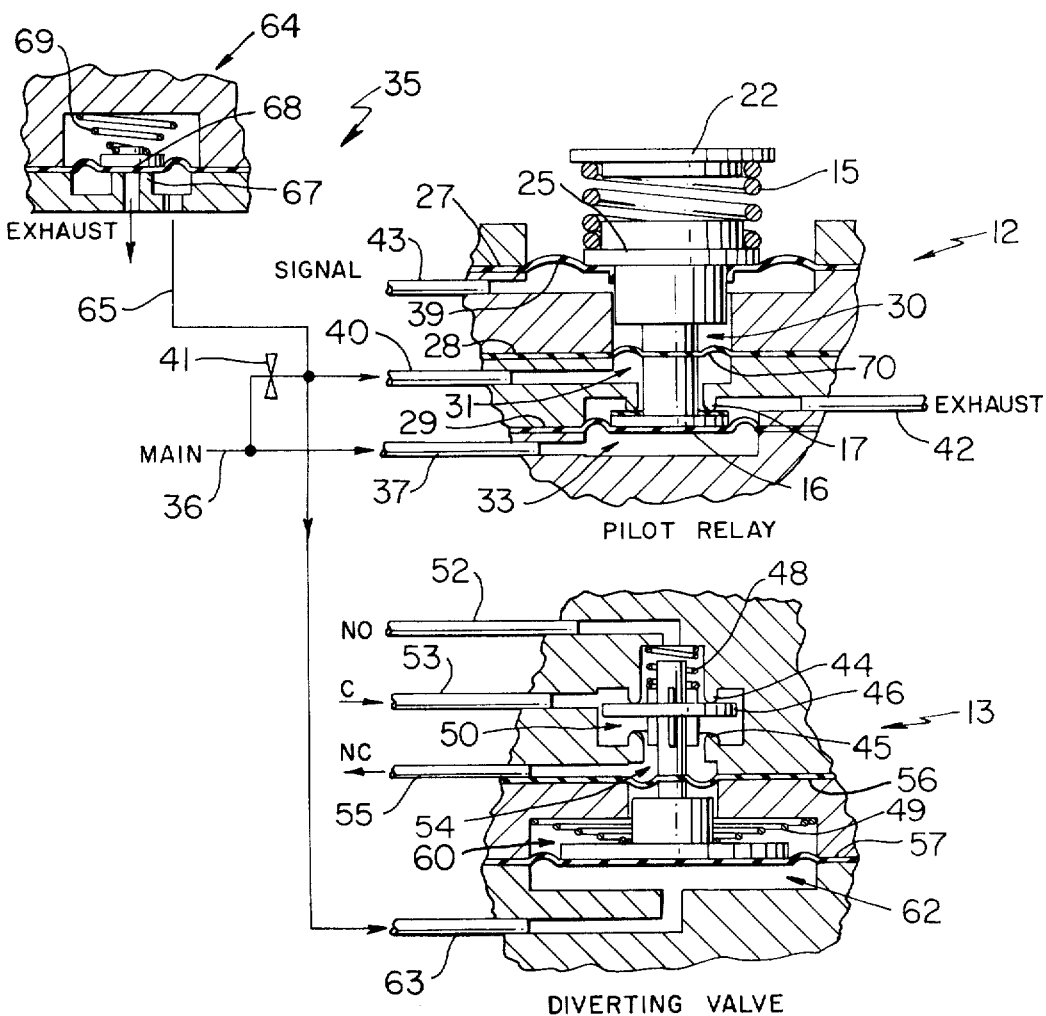
FIG. 4 is a view similar to FIG. 3 and illustrates the diverting relay construction of FIGS. 1 and 2 in another operating condition thereof.

Referring now to FIGS. 1 and 2, one embodiment of the improved diverting relay construction of this invention is generally indicated by the reference numeral 10 and comprises a housing means 11 containing therein a pilot relay means of this invention that is generally indicated by the reference numeral 12 in FIG. 2 and is schematically illustrated in FIGS. 3 and 4. The housing means 11 also contains a diverting valve means that is generally indicated by the reference numeral 13 in FIG. 2 and is schematically illustrated in FIGS. 3 and 4, as will be apparent hereinafter.

The pilot relay means 12 includes a control knob selector means 14 for varying the force of a compression spring 15 acting downwardly on a valve member 16 to tend to force the valve member 16 away from a valve seat 17 of the housing means 11. In this manner, the operator, by rotating the control knob 14, can adjust the pilot relay means 12 to produce a pneumatic pilot output signal whenever the same receives a control signal of a certain magnitude which is selected within limits by the control knob 14 as will be apparent hereinafter.

The control knob 14 has a threaded bore 18 threadedly receiving an externally threaded tubular part 19 of the housing 11 whereby rotational movement of the control knob 14 relative to the housing 11 causes an internal end wall means 20 of the control knob 14 to axially move upwardly and downwardly relative to the housing 11 and, through the abutment of an adjusting member 21 carried thereby and acting on an upper spring retainer 22 for the compression spring 15, vary the force of the compression spring 15 acting downwardly on a valve member stack that is generally indicated by the reference numeral 23 in FIG. 2 to operate on the valve member 16 to tend to move the valve member 16 away from the valve seat 17.

Since the valve stack 23 can be formed in any desired configuration and arrangement of parts, a simplified version of the pilot relay means 12 is illustrated schematically in FIGS. 3 and 4 and will now be described with the understanding that the schematic showing of the structure of the pilot relay means 12, as well as the schematic showing of the structure of the diverting valve means 13, in FIGS. 3 and 4 slightly changed from the similar structure illustrated in FIG. 2.

As illustrated in FIG. 3, the valve member stack 23 has the lower end 24 of the compression spring 15 acting on an upper disc-like part 25 thereof while the upper end 26 of the spring 15 acts against the spring retainer 22 that is moved axially upwardly and downwardly by the control knob 14 in the manner previously described.

The housing means 11 is so constructed and arranged that the same cooperates with three diaphragm members 27, 28, and 29 carried thereby and respectively being operatively interconnected to the valve member 16 and its stack 23 in such a manner that a chamber 30 is defined between the diaphragm members 27 and 28 with the effective area of the chamber 30 acting on the diaphragm 27 being larger than the effective area of the chamber 30 acting on the diaphragm 28 as illustrated. Also, the diaphragm member 28 cooperates with the housing means 11 to define a chamber 31 between the diaphragm 28 and the valve seat 17.

The diaphragm 29 cooperates with the housing 11 to define a chamber 32 between the diaphragm 29 and the valve seat 17.

The diaphragm 29 also cooperates with the housing 11 to define a chamber 33 between the diaphragm member 29 and an internal surface 34 of the housing 11.

The pilot relay means 12 is schematically illustrated in FIGS. 3 and 4 as being utilized in a pneumatically operated control system of this invention that is generally indicated by the reference numeral 35 and comprises a main source of fluid pressure such as pressurized air, that is designated by the reference numeral 36 and is adapted to be directed by a conduit means 37 to the chamber 33 of the pilot relay means 12 to act against the under side 38 of diaphragm 29 to tend to move the valve member 16 to a closed position against the valve seat 17 in opposition to the force of the compression spring 15.

However, as long as the pressure in the chamber 30 that is acting on the under side 39 of the upper diaphragm 27 is below a selected magnitude setting of the knob 14 controlling the force of the compression spring 15, the compression spring 15 is adapted to maintain the valve member 16 in an open position away from the valve seat 17 in opposition to the force of the pressure fluid in the chamber 33 acting upwardly on the diaphragm 29 as well as the force of the pressure in the chamber 30 acting upwardly on the diaphragm 27 as long as such force in the chamber 30 is below the magnitude setting on the control knob 14.

Another conduit means 40 leads from the main supply 36 to the chamber 31 of the pilot relay means 12, the conduit 40 having a restriction 41 therein intermediate the main supply 36 and the chamber 31 for a purpose hereinafter described.

The chamber 32 is adapted to be interconnected to the atmosphere or other exhaust means by a conduit 42.

A pneumatic signal generating means 43 is fluidly interconnected to the chamber 30 of the pilot relay means 12.

Therefore, it can be seen that the pilot relay means 12 of this invention can be formed of relatively simple parts to operate in a manner hereinafter described.

The diverting valve means 13 is formed in the housing means 11 and comprises a pair of opposed valve seats 44 and 45 adapted to be respectively controlled by a movable valve member 46 having a valve stack 47 operatively interconnected thereto and being urged in a downwardly direction by an upper compression spring 48 and a lower compression spring 49 to tend to hold the valve member 46 in a closed condition against the valve seat 45 so that the valve seat 44 will normally be in an open condition and interconnect a chamber 50 of the housing means 11 to another chamber 51 of the housing 11 that is interconnected to a desired control device (not shown) by a conduit means 52. In this manner, a fluid pressure supply that is interconnected to the chamber 50 by a conduit 53 is adapted to be normally interconnected by the diverting valve 13 to the control device interconnected to the conduit 52 as long as the diverting valve means 13 is in the operative condition illustrated in FIG. 3.

However, when the diverting valve means 13 is operated to the condition illustrated in FIG. 4 in a manner hereinafter described, the valve member 46 closes the valve seat 44 while opening the valve seat 45 whereby the chamber 50 is now interconnected by the open valve seat 45 to another chamber 54 of the housing means 11 and, thus, to another conduit means 55 that leads to another pneumatically operated control device (not shown) to operate the same.

Therefore, it can be seen that the diverting valve means 13 is adapted to interconnect the fluid pressure from the common conduit 53 to the conduit 52 when the diverting valve is in the condition illustrated in FIG. 3 or to the conduit 55 when the diverting valve means 13 is in the condition illustrated in FIG. 4.

The housing 11 carries a pair of flexible diaphragms 56 and 57 that are respectively operatively interconnected to the diaphragm stack 47 as will be apparent hereinafter, the diaphragm 56 cooperating with the housing means 11 to define the chamber 54 between the upper side 58 of the diaphragm 56 and the valve seat 45.

The diaphragm 57 has its upper side 59 cooperating with the housing means 11 to define a chamber 60 between the diaphragms 56 and 57 as illustrated, the chamber 60 being vented to the atmosphere and the effective area of the diaphragm 56 being relatively small compared to the effective area of the diaphragm 57 so that fluid pressure in the chamber 54 will have a minimal affect on the valve operation in response to fluid pressure changes in the actuating chamber 62.

The diaphragm 57 also cooperates with an internal end wall means 61 of the housing means 11 to define a chamber 62 therebetween, the chamber 62 being adapted to be interconnected to a conduit means 63 that is fluidly interconnected to the conduit 40 intermediate the restrictor 41 and the chamber 31 of the pilot relay means 12.

Similarly, a maximum pressure bleed means that is generally indicated by the reference numeral 64 in FIGS. 3 and 4 is interconnected by a conduit means 65 to the conduit 40 intermediate the restrictor 41 and the chamber 31 of the pilot relay means 12.

The maximum pressure bleed 64 is formed in the housing means 11 and is defined by a chamber 66 that is interconnected to the conduit 65, the chamber 66 being adapted to be interconnected to a valve seat 67 that leads to the atmosphere or other exhaust means when a valve means 68 is moved to an open condition. The valve means 68 comprises a flexible diaphragm carried by the housing means 11 and is normally urged to a closed position agains the valve seat 67 by a compression spring 69. However, when the pressure in the chamber 66 exceeds a certain amount, the same will move the diaphragm 68 upwardly in opposition to the force of the compression spring 69 and thus interconnect the chamber 66 through the open valve seat 67 to an exhaust so that the pressure in the conduit 65 and, thus, in the conduits 63 and 40 will not exceed a certain maximum value.

In this manner, the bleed means 64 will prevent changes in the pressure of the source 36 from affecting the diverting point of the diverting valve means 13 as will be apparent hereinafter.

Therefore, it can be seen that the relay construction 10 of this invention can comprise relatively simple structure that can be packaged in a single housing 11 to be utilized in the pneumatic control system 35 in a manner now to be described.

Assume that the control system 35 operates a heat exchanger means that is controlled by the control devices interconnected to the conduits 52 and 55 and that the signal generating means 43 has the magnitude of its signal in relation to the output effect of the heat exchange means.

Assuming that the operator has adjusted the control knob 14 of the diverting relay construction 10 to a desired position so that the magnitude of the pneumatic signal being directed by the signal generating means 43 to the chamber 30 must be at a certain magnitude before it is desired that the pressure source 53 be interconnected to the control device interconnected to the conduit 55, and assuming that the signal in the chamber 30 has not reached such a magnitude, the force of the compression spring 15 is such that the same maintains the valve member 16 in the open condition as illustrated in FIG. 3 in opposition to the force of the pressure of the main source 36 in the chamber 33 whereby no pilot output pressure is created in the chamber 31 of the pilot relay means because the main pressure that is bleeding through the restrictor 41 into the conduit 40 is directed through the open valve seat 17 to the exhaust so that the pilot output pressure is at zero. Since the orifice of the restrictor 41 is relatively small compared to the area of the port in the valve seat 17 and exhaust 42 no pressure exists in the chamber 31 and thus in the actuating chamber 62 of the diverting valve 13.

With the pilot output pressure at zero, the force of the compression springs 48 and 49 maintains the valve member 46 of the diverting valve means 13 in its closed condition against the valve seat 45 so that the pressure source conduit 53 is interconnected through the opened valve seat 44 to the conduit 52 leading to the control device interconnected to the conduit 52 whereby the heat exchanger is caused to operate under a certain operating condition thereof.

However, when the magnitude of the signal being directed by the signal generating means 43 to the chamber 30 reaches the selected magnitude of the control knob 14, the force of the pressure fluid in the chamber 30 acting on the other side 39 of the diaphragm 27 is sufficient to overcome the force of the compression spring 15 and move the same upwardly in the manner illustrated in FIG. 4 whereby the valve member 16 closes against the valve seat 17 and, thus, disconnects the chamber 31 from the exhaust 42.

With the pilot relay means 12 now in the condition illustrated in FIG. 4, the pilot output pressure in the chamber 31 is adapted to now build up as the main pressure 36 bleeds through the restrictor 41 into the chamber 31 and, thus, into the conduits 65 and 63. The pressure now in chamber 31 acts on diaphragm 70 and reinforces the input signal in the chamber 30 to close the valve member 16 firmly against the valve seat 17.

The pilot output rapidly reaches a particular force and the same acts in the chamber 62 of the diverting valve means 13 to move the diaphragm 57 upwardly in opposition to the force of the compression springs 48 and 49 to cause the valve member 46 to move away from the valve seat 45 and close against the valve seat 44 with substantially a snap action as illustrated in FIG. 4 whereby the pressure source 53 is now interconnected to the conduit 55, and, thus, to the device interconnected to the conduit 55 whereby the heat exchanger is operated in another condition thereof.

With the control system 35 now in the condition illustrated in FIG. 4, a drop in the magnitude of the pneumatic signal being directed by the generating means 43 into the chamber 30 reduces the force acting on the under side 39 of the diaphragm 27 tending to oppose the force of the compression spring 15 tending to open the valve member 16. However, since the pilot output pressure in the chamber 31 has now built up to a holding pressure under the control of the bleed means 64, it can be seen that the force of the pressure fluid in the chamber 31 is now acting upon the under side 70 of the diaphragm 28 to oppose the force of the compression spring 15 so that the force of the pressure in the chamber 30 must fall a fixed differential from the selected magnitude to cause the pilot relay means to move from the condition illustrated in FIG. 3 to the condition illustrated in FIG. 4.

In particular, this fixed differential is determined by the ratio of the effective area of the diaphragm 39 and the effective area of the diaphragm 28 minus the effective area of the valve seat 17 as the fluid pressure in the chamber 33 is also acting against the diaphragm 29 to tend to maintain the valve member 16 in its closed condition.

However, when the force of the signal being directed to the chamber 30 falls below the aforementioned fixed differential value from the selected value of the setting of the control knob 14, the force of the compression spring 15 is sufficient to now move the valve member 16 downwardly to crack open the valve seat 17. Since the orifice of the restrictor 41 is relatively small compared to the area of the port in the valve seat 17 and the exhaust 42, the initial cracking open of the valve seat 17 causes the pressure in the chamber 31 to decrease rapidly and sharply and thereby reduces the force of the pressure acting upwardly on the diaphragm 70 causing the spring 15 to rapidly drive the valve 16 to its fully open position as illustrated in FIG. 3. Thus, the pilot outlet pressure in the chamber 31 is rapidly dumped to the exhaust 42 through the open valve means 17 so that the force in the chamber 62 of the diverting valve means 13 rapidly falls to zero and the compression springs 48 and 49 move the valve member 46 downwardly with substantially a snap action to close the valve seat 45 and open the valve seat 44 as illustrated in FIG. 3. Thus, the heat exchanger is now again operating under its first operating condition.

In this manner, it can be seen that the chamber 31 of the pilot valve 12 is a positive feedback chamber for the pilot valve 12 and guarantees that the actuator chamber 62 of the diverting valve 13 will see nothing but a clear cut positive pressure or a full dump to atmosphere which, in turn, causes snap action of the diverting valve without regard to the rate of change of the input signal. Accordingly, once the diverting action of the diverting valve 13 starts, it goes all the way with no possibility of hang-up, partial stroke or starting to switch and then going back to its original position — such possibilities happening with conventional diverting valves that see a very slowly changing, slightly fluctuating, input signal. However, the snap acting diverting action of the three-way valve 13 of this invention is achieved through the provision of the feed-back means which provides positive feed-back to the pilot valve 12 to force it to go through its entire stroke once it starts as previously described. The feed back function is accomplished by controlling the pressure in the feed back chamber 31 of the pilot valve 12.

By having the valve member 68 of the bleed means 64 set to open at the lowest value expected for the main pressure supply 36, the value of the pilot output from the pilot relay means 12 will always be the same regardless of the value of the main pressure supply 36 so that the diverting valve means 13 will always switch from the condition illustrated in FIG. 3 to the condition illustrated in FIG. 4 and back again from the condition illustrated in FIG. 4 to the condition illustrated in FIG. 3 at the same values of the pilot output in relation to the setting of the knob 14.

Therefore, it can be seen that this invention not only provides an improved pilot relay means that has an adjustable high setting thereof with a fixed low differential, but also this invention provides an improved adjustable diverting relay construction and control system utilizing such a pilot relay means or the like where the diverting action occurs with a snap action without regard to the rate of change of the input signal.

While the pilot relay means 12 previously described has selector means 14 for adjusting the compression spring 15 to select the required signal value to operate the same, it is to be understood that the pilot relay means of this invention could be differential pressure operated so that pneumatic selector means will be provided for the same for selecting the magnitude of the signal pressure that is required to operate the pilot relay means.

Figure 5:
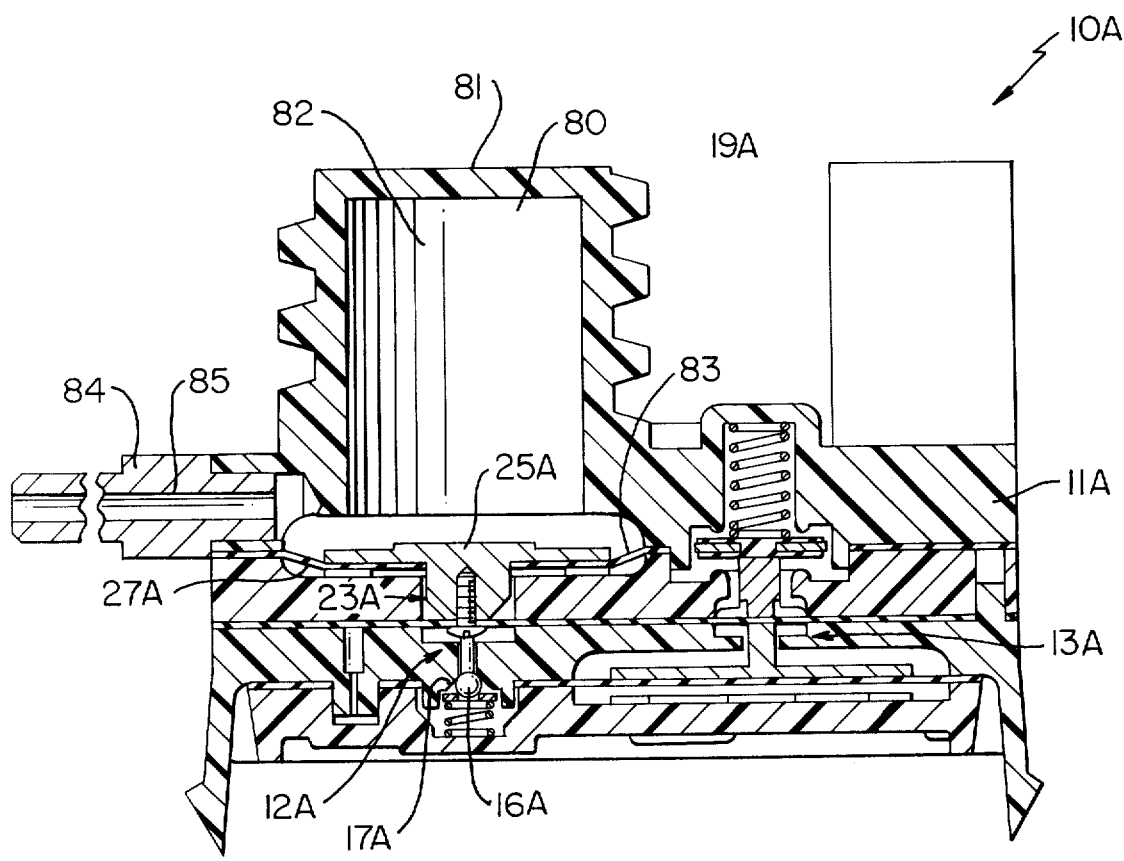
FIG. 5 is a view similar to FIG. 2 and illustrates another diverting relay construction of this invention.

In particular, another pneumatically operated diverting relay construction of this invention is generally indicated by the reference numeral 10A in FIG. 5 and parts thereof similar to the pneumatically operated diverting relay construction 10 of FIGS. 1–4 are indicated by like reference numerals followed by the reference letter A. Similarly, the pneumatically operated diverting relay construction 10A of FIG. 5 is schematically illustrated in FIGS. 6 and 7 for use in a system 35A of this invention, with parts of the system 35A that are similar to the system 35 previously described being indicated by the same reference numeral and also followed by the reference letter A.

As illustrated in FIG. 5, the pneumatically operated diverting relay construction 10A is substantially identical to the pneumatically operated diverting relay construction 10 of FIGS. 1 and 2 except that the pneumatically operated diverting relay construction 10A does not have the selector knob 14 and range spring 15 as the pilot relay means 12A thereof is differential pressure operated.

In particular, the housing means 11A while having the threaded portion 19a extending therefrom has the upper end 80 sealed closed by a wall means 81 to define a chamber 82 above the side 83 of the diaphragm 27A and an inlet fitting 84 is interconnected to the housing 11A so as to have its passage 85 fluidly interconnected with the chamber 82. Thus, the fitting 84 can be interconnected to a suitable pressure source by flexible conduit means in a manner well known in the art. In order to insure that the chamber 82 will be fluid sealed by the diaphragm 27A, the diaphragm 27A can be sealed to the upper part 25A of the diaphragm stack 23A by a suitable adhesive or the like.

Figure 6:
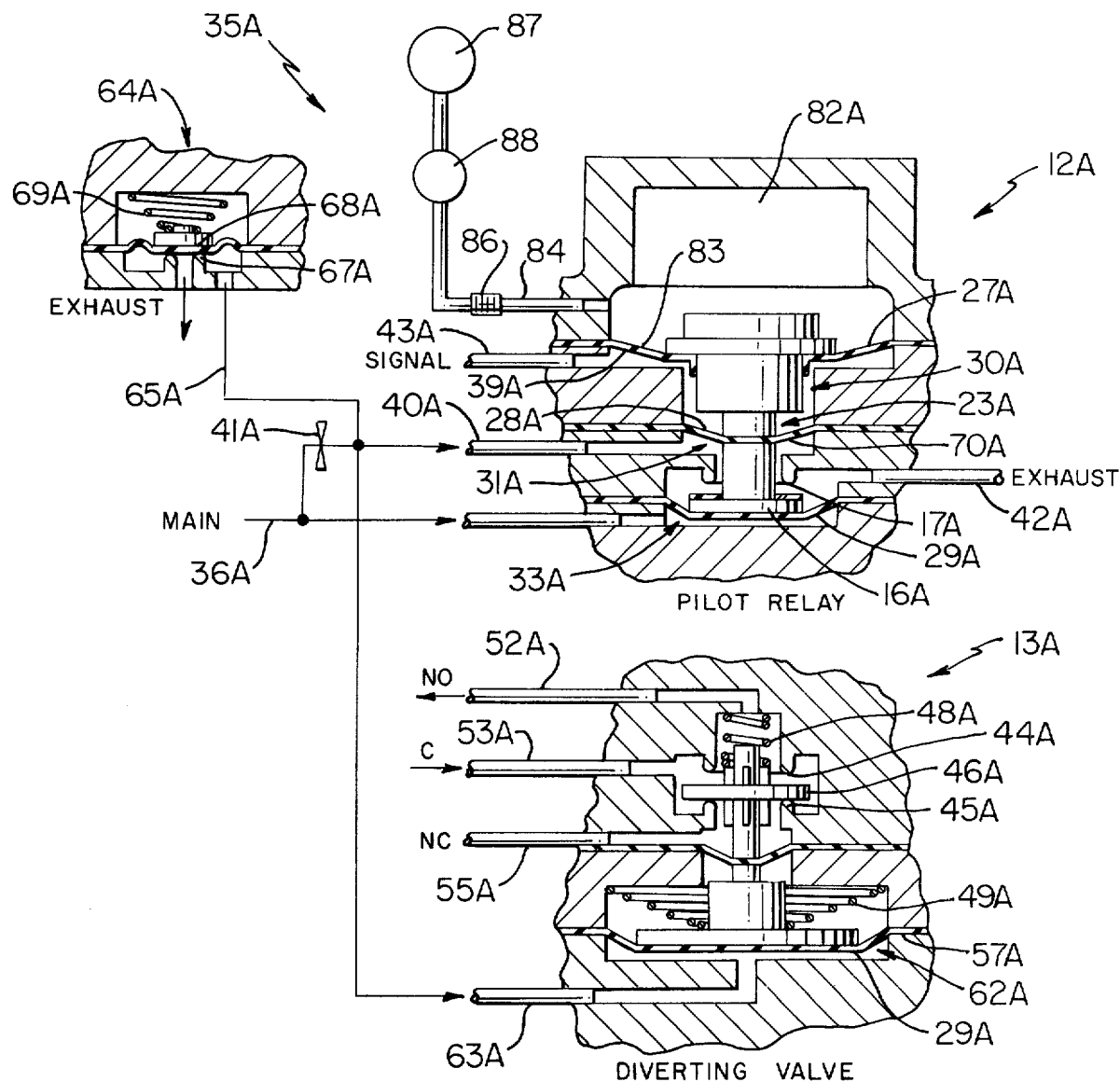
FIGS. 6 and 7 are respectively views similar to FIGS. 3 and 4 wherein the system of this invention is utilizing the diverting relay construction of FIG. 5.
Figure 7:
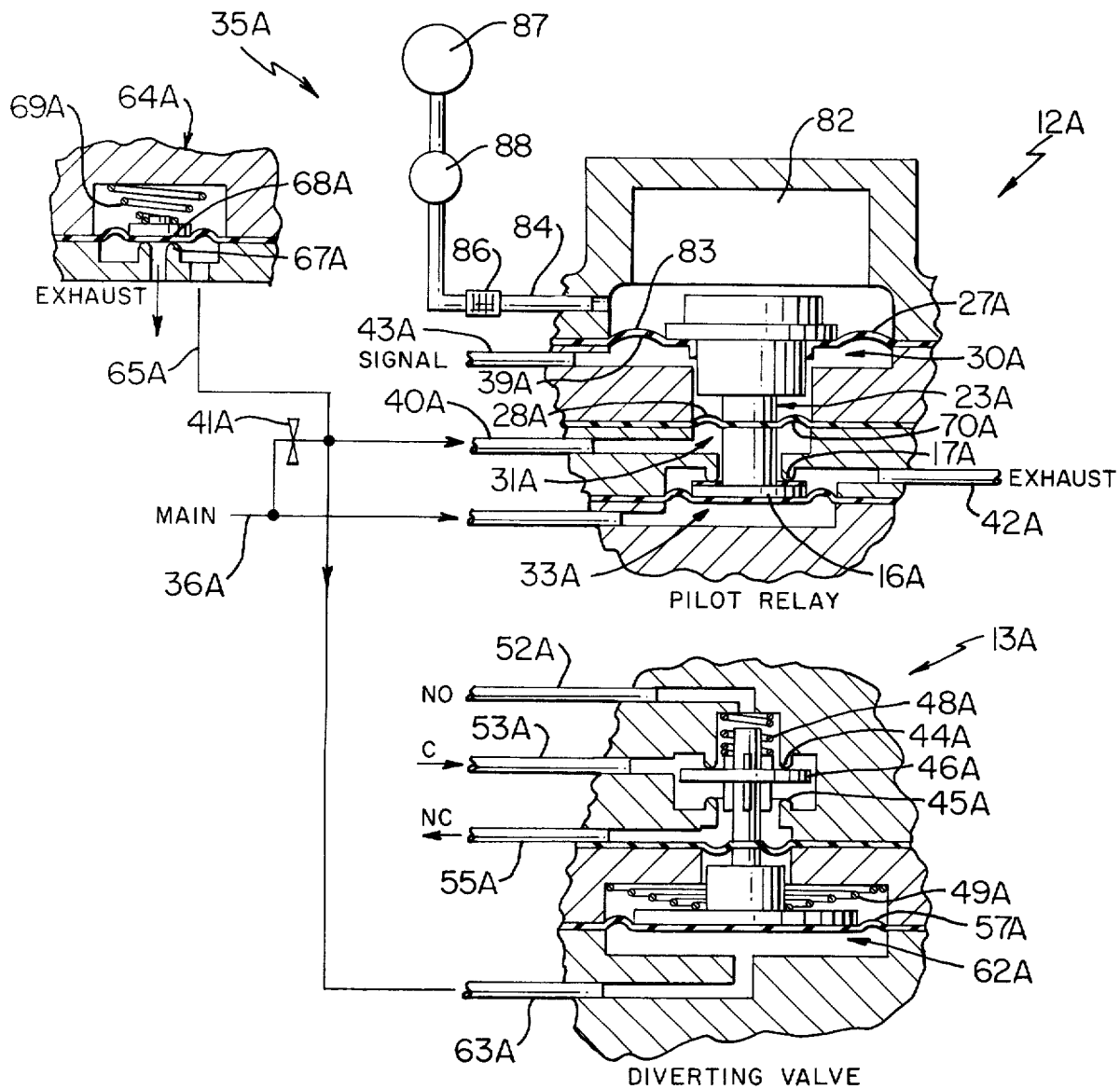

Thus, it can be seen that it is a relatively simple matter to convert the basic housing means 11 of the pneumatically operated diverting relay construction 10 of FIGS. 1 and 2 to form the relay construction 10A of FIG. 5 wherein the pilot relay means 12A will be differential pressure operated and operate in the system 35A of FIGS. 6 and 7 in a manner now to be described.

As illustrated in FIGS. 6 and 7, the pilot relay means 12A has the fitting 84 thereof interconnected by suitable conduit means 86 to a source of pressure fluid 87, the conduit means 86 having a selector valve 88 therein which can selectively set the desired pressure being delivered from the source 87 to the chamber 82 of the pilot relay means 12A.

For example, assuming that the control system 35A operates a heat exchanger means that is controlled by the control devices interconnected to the conduits 52A and 55A and that the signal generating means 43A has the magnitude of its signal in relation to the output effect of the heat exchange means and assuming that the operator has adjusted the selector valve 88 to a desired set position thereof so that the magnitude of the pneumatic signal being directed by the signal generating means 43A to the chamber 30A must be at a certain magnitude before it is desired that the pressure source 33A be interconnected to the control device interconnected to the conduit 55A and assuming that the signal in the chamber 30A has not reached such a magnitude, the force of the pressure fluid in the chamber 82 of the pilot relay means 12A is such that the same maintains the valve member 16A in the open condition as illustrated in FIG. 6 in opposition to the force of the pressure of the main source 36A in the chamber 33A whereby no pilot output pressure is created in the chamber 31A of the pilot relay means 12A because the main pressure that is bleeding through the restrictor 41A into the conduit 40A is directed through the open valve seat 17A to the exhaust so that the pilot output pressure is at zero.

With the pilot output pressure at zero, the force of the compression springs 48A and 49A maintains the valve member 46A of the dirverting valve mans 13A in its closed condition against the valve seat 45A so that the pressure source conduit 53A is interconnected through the opened valve seat 44A to the conduit 52A leading to the control device interconnected to the conduit 52A whereby the heat exchanger is caused to operate under a certain operating condition thereof.

However, when the magnitude of the signal being directed by the signal generating means 43A to the chamber 30A reaches the selected magnitude of the selector valve 88, the force of the pressure fluid in the chamber 30A acting on the other side 39A of the diaphragm 27A is sufficient to overcome the force of the pressure fluid in the chamber 82 acting on the side 83 of the diaphragm 27A and moves the diaphragm 27A upwardly in the manner illustrated in FIG. 7 whereby the valve member 16A closes against the valve seat 17A and, thus, disconnects the chamber 31A from the exhaust 42A.

With the pilot relay means 12A now in the condition illustrated in FIG. 7, the pilot output pressure in the chamber 31A is adapted to now build up as the main pressure 36A bleeds through the restrictor 41A into the chamber 31A and, thus, into the conduits 65A and 63A. The pressure now in chamber 31A acts on diaphragm 70A and reinforces the input signal in the chamber 30A to close the valve member 16A firmly against the valve seat 17A.

The pilot output rapidly reaches a particular force and the same acts in the chamber 62A of the diverting valve means 13A to move the diaphragm 57A upwardly in opposition to the force of the compression springs 48A and 49A to cause the valve member 46A to move away from the valve seat 45A and close against the valve seat 44A with substantially a snap action as illustrated in FIG. 7 whereby the pressure source 53A is now interconnected to the conduit 55A and, thus, to the device interconnected to the conduit 55A whereby the heat exchanger is operated in another condition thereof.

With the control system 35A now in the condition illustrated in FIG. 7, a drop in the magnitude of the pneumatic signal being directed by the generating means 43A into the chamber 30A reduces the force acting on the under side 39A of the diaphragm 27A tending to oppose the force of the pressure fluid in the chamber 82 tending to open the valve member 16A. However, since the pilot output pressure in the chamber 31A has now built up to a holding pressure under the control of the bleed means 64A, it can be seen that the force of the pressure fluid in the chamber 31A is now acting upon the under side 70A of the diaphragm 28A to oppose the force of the pressure fluid in the chamber 82 so that the force of the pressure in the chamber 30A must fall a fixed differential from the selected magnitude to cause the pilot relay means 12A to move from the condition illustrated in FIG. 7 back to the condition illustrated in FIG. 6.

In particular, this fixed differential is determined by the ratio of the effective area of the diaphragm 39A and effective area of the diaphragm 28A minus the effective area of the valve seat 17A as the fluid pressure in the chamber 33A is also acting against the diaphragm 29A to tend to maintain the valve member 16A in its closed condition.

However, when the force of the signal being directed to the chamber 30A falls below the aforementioned fixed differential value from the selected value of the setting of the selector valve 88, the force of the pressure in the chamber 82 is sufficient to now move the valve member 16A downwardly to crack open the valve seat 17A. Since the orifice of the restrictor 41A is relatively small compared to the area of the port in the valve seat 17A and the exhaust 42A, the initial cracking open of the valve seat 17A causes the pressure in the chamber 31A to decrease rapidly and sharply and thereby reduce the force of the pressure acting upwardly on the diaphragm 70A causing the pressure in the chamber 82 to rapidly drive the valve 16A to its fully open position as illustrated in FIG. 8. Thus, the pilot output pressure in the chamber 31A is rapidly dumped to the exhaust 42A through the open valve means 17A so that the force in the chamber 62A of the diverting valve means 13A rapidly falls to zero and the compression springs 48A and 49A move the valve member 46A downwardly with substantially a snap action to close the valve seat 45A and open the valve seat 44A as illustrated in FIG. 6. Thus, the heat exchanger is now again operating under its first operating condition.

In this manner, it can be seen that the chamber 31A of the pilot valve 12A is a positive feedback chamber for the pilot valve 12A and guarantees that the actuator chamber 62A of the diverting valve 13A will see nothing but a clear cut positive pressure or a full dump to atmosphere which, in turn, causes snap action of the diverting valve without regard to the rate of change of the input signal. Accordingly, once the diverting action of the diverting valve 13A starts, it goes all the way with no possibility of hang-up, partial stroke or starting to switch and then going back to its original position—such possibilities happening with conventional diverting valves that see a very slowly changing, slightly fluctuating, input signal. However, the snap acting diverting action of the three-way valve 13A of this invention is achieved through the provision of the feed-back means which provides positive feed-back to the pilot valve 12A to force it to go through its entire stroke once it starts as previously described. The feed-back function is accomplished by controlling the pressure in the feed-back chamber 31A of the pilot valve 12A.

By having the valve member 68A of the bleed means 64A set to open at the lowest value expected for the main pressure supply 36A, the value of the pilot output from the pilot relay means 12A will always be the same regardless of the value of the main pressure supply 36A so that the divering valve means 13A will always switch from the condition illustrated in FIG. 6 to the condition illustrated in FIG. 7 and back again from the condition illustrated in FIG. 7 to the condition illustrated in FIG. 6 at the same value of the pilot output in relation to the setting of the selector valve 88.

Therefore, it can be seen that this invention not only provides an improved differential pressure operated pilot relay means that has an adjustable high setting thereof with a fixed low differential, but also this invention provides an improved adjustable diverting relay construction and control system utilizing such a pilot relay means or the like where the diverting action occurs with a snap action without regard to the rate of changes of the input signal.

While the form of the invention now preferred has been illustrated and described as required by the Patent Statute, it is to be understood that other forms may be utilized and still come within the scope of the appended claims.

What is claimed is:

1. A pneumatically operated diverting relay construction comprising a differential pressure operated pilot relay means and a diverting valve means operatively associated together, said pilot relay means having means for sending a pneumatic pilot output to said diverting valve means to switch said diverting valve means from one condition thereof to another condition thereof when said pilot relay means receives a pneumatic signal of a certain magnitude, said pilot relay means having pneumatic means for selecting within limits the magnitude of said pneumatic signal that is required for said pilot relay means to produce said pneumatic pilot output for switching said diverting valve means from said one condition thereof to said other condition thereof, said pilot relay means having means for terminating said pneumatic pilot output to cause said diverting valve means to switch from said other condition thereof to said one condition thereof when said pneumatic signal falls to another certain magnitude, the last named means causing said other certain magnitude to be a fixed differential from said selected magnitude thereof.

2. A pneumatically operated diverting relay construction as set forth in claim 1 wherein said last-named means comprises a first diaphragm of said pilot relay means that has said pilot output acting thereon when said pilot output is produced.

3. A pneumatically operated diverting relay construction as set forth in claim 2 wherein said pneumatic means for selecting said certain magnitude of said pneumatic signal comprises a chamber for receiving a pneumatic pressure input, said diaphragm opposing the force of said pressure input when having said pilot output acting thereon.

4. A pneumatically operated diverting relay construction as set forth in claim 3 wherein said means of said pilot relay for sending said pilot output comprises a movable valve member which when moved to the closed position thereof causes said pilot output to be created and when moved to the open position thereof causes said pilot output to be terminated, said pressure input acting on said valve member in a direction to tend to open said valve member.

5. A pneumatically operated diverting relay construction as set forth in claim 4 wherein said pilot relay means has a second diaphragm carried by said valve member and is subject to having said pneumatic signal act thereon to tend to move said valve member to the closed position thereof, said chamber being defined in part by said second diaphragm.

6. A pneumatically operated diverting relay construction as set forth in claim 5 wherein said pilot relay means has a third diaphragm carried by said valve member and is subject to having fluid pressure act on the same to tend to move said valve member to the closed position thereof.

7. A pneumatically operated diverting relay construction as set forth in claim 6 wherein said pilot relay means has a valve seat that is opened and closed by said valve member and is disposed between said first and third diaphragms.

8. A pneumatically operated diverting relay construction as set forth in claim 7 wherein said pilot relay means has another chamber defined between said first and second diaphragms and which receives said pneumatic signal.

9. A pneumatically operated control system comprising a source of fluid, a pneumatic signal producing means, a differential pressure operated pilot relay means, and a diverting valve means, said pilot relay means having means for sending a pneumatic pilot output from said source to said diverting valve means to switch said diverting valve means from one condition thereof to another condition thereof when said pilot relay means receives a pneumatic signal of a certain magnitude from said signal producing means, said pilot relay means having pneumatic means for selecting within limits the magnitude of said pneumatic signal that is required for said pilot relay means to produce said pneumatic pilot output for switching said diverting valve means from said one condition thereof to said other condition thereof, said pilot relay means having means for terminating said pneumatic pilot output to cause said diverting valve means to switch from said other condition thereof to said one condition thereof when said pneumatic signal falls to another certain magnitude, the last named means causing said other certain magnitude to be a fixed differential from said selected mangitude thereof.

10. A pneumatically operated control system as set forth in claim 9 wherein said last-named means comprises a first diaphragm of said pilot relay means that has said pilot output acting thereon when said pilot output is produced.

11. A pneumatically operated control system as set forth in claim 10 wherein said pneumatic means for selecting said certain magnitude of said pneumatic signal comprises a chamber for receiving a pneumatic pressure input, said diaphragm opposing the force of said pressure input when having said pilot output acting thereon.

12. A pneumatically operated control system as set forth in claim 11 wherein said means of said pilot relay for sending said pilot output comprises a movable valve member which when moved to the closed position thereof causes said pilot output to be created and when moved to the open position thereof causes said pilot output to be terminated, said pressure input acting on said valve member in a direction to tend to open said valve member.

13. A pneumatically operated control system as set forth in claim 12 wherein said pilot relay means has a second diaphragm carried by said valve member and is subject to having said pneumatic signal act thereon to tend to move said valve member to the closed position thereof, said chamber being defined in part by said second diaphragm.

14. A pneumatically operated control system as set forth in claim 13 wherein said pilot relay means has a third diaphragm carried by said valve member and is subject to having fluid pressure act on the same to tend to move said valve member to the closed position thereof.

15. A pneumatically operated control system as set forth in claim 14 wherein said pilot relay means has a valve seat that is opened and closed by said valve member and is disposed between said first and third diaphragms.

16. A pneumatically operated control system as set forth in claim 15 wherein said pilot relay means has another chamber defined between said first and second diaphragms and which receives said pneumatic signal.

17. A differential pressure operated pilot relay means comprising a housing means, said pilot relay means having means for sending a pneumatic pilot output when said pilot relay means receives a pneumatic signal of a certain magnitude, said pilot relay means having pneumatic means for selecting within limits the magnitude of said pneumatic signal that is required for said pilot relay means to produce said pneumatic pilot output, said pilot relay means having means for terminating said pneumatic pilot output when said pneumatic signal falls to another certain magnitude, the last named means causing said other certain magnitude to be fixed differential from said selected magnitude thereof.

18. A differential pressure operated pilot relay means as set forth in claim 17 wherein said last-named means comprises a first diaphragm of said pilot relay means that is carried by said housing means and has said pilot output acting thereon when said pilot output is produced.

19. A differential pressure operated pilot relay means as set forth in claim 18 wherein said pneumatic means for selecting said certain magnitude of said pneumatic signal comprises a chamber for receiving a pneumatic pressure input, said diaphragm opposing the force of said pressure input when having said pilot output acting thereon.

20. A differential pressure operated pilot relay means as set forth in claim 19 wherein said means of said pilot relay for sending said pilot output comprises a movable valve member carried by said housing means and which when moved to the closed position thereof causes said pilot output to be created and when moved to the open position thereof causes said pilot output to be terminated, said pressure input acting on said valve member in a direction to tend to open said valve member.

21. A differential pressure operated pilot relay means as set forth in claim 20 wherein said pilot relay means has a second diaphragm carried by said valve member and is subject to having said pneumatic signal act thereon to tend to move said valve member to the closed position thereof, said chamber being defined in part by said second diaphragm.

22. A differential pressure operated pilot relay means as set forth in claim 21 wherein said pilot relay means has a third diaphragm carried by said valve member and is subject to having fluid pressure act on the same to tend to move said valve member to the closed position thereof.

23. A differential pressure operated pilot relay means as set forth in claim 22 wherein said housing means has a valve seat that is opened and closed by said valve member and is disposed between said first and third diaphragms.

24. A differential pressure operated pilot relay means as set forth in claim 23 wherein said housing means has another chamber defined between said first and second diaphragms and which receives said pneumatic signal.

25. A pneumatically operated diverting relay construction comprising a differential pressure operated pilot relay means and a diverting valve means operatively associated together, said pilot relay means having means for sending a pneumatic pilot output to said diverting valve means to switch said diverting valve means from one condition thereof to another condition thereof when said pilot relay means receives a pneumatic signal of a certain magnitude, said pilot relay means having pneumatic means for selecting within limits the magnitude of said pneumatic signal that is required for said pilot relay means to produce said pneumatic pilot output for switching said diverting valve means from said one condition thereof to said other condition thereof, said pilot relay means having means for terminating said pneumatic pilot output to cause said diverting valve means to switch from said other condition thereof to said one condition thereof when said pneumatic signal falls to another certain magnitude, said switching of said diverting valve means from said other condition thereof to said one condition thereof taking place with substantially a snap action.

26. A pneumatically operated diverting relay construction as set forth in claim 25 wherein said diverting valve means has an actuating chamber and said pilot relay means has a positive feed back chamber interconnected to said actuating chamber.

27. A pneumatically operated diverting relay construction as set forth in claim 26 wherein said feed back chamber of said pilot relay means is adapted to produce said pneumatic pilot output and terminate said pneumatic pilot output.

28. A pneumatically operated diverting relay construction as set forth in claim 27 wherein said pilot relay means has valve means for interconnecting said feed back chamber to exhaust to terminate said pneumatic pilot output and for disconnecting said feed back chamber from said exhaust to create said pneumatic pilot output.

29. A pneumatically operated diverting relay construction as set forth in claim 28 wherein said pilot relay is substantially snap acting when said valve means initially interconnects said feed back chamber to said exhaust.

30. A pneumatically operated control system comprising a source of fluid, a pneumatic signal producing means, differential pressure operated pilot relay means, and a diverting valve means, said pilot relay means having means for sending a pneumatic pilot output from said source to said diverting valve means to switch said diverting valve means from one condition thereof to another condition thereof when said pilot relay means receives a pneumatic signal of a certain magnitude from said signal producing means, said pilot relay means having pneumatic means for selecting within limits the magnitude of said pneumatic signal that is required for said pilot relay means to produce said pneumatic pilot output for switching said diverting valve means from said one condition thereof to said other condition thereof, said pilot relay means having means for terminating said pneumatic pilot output to cause said diverting valve means to switch from said other condition thereof to said one condition thereof when said pneumatic signal falls to another certain magnitude, said switching of said diverting valve means from said other condition thereof to said one condition thereof taking place with substantially a snap action.

31. A pneumatically operated control system as set forth in claim 30 wherein said diverting valve means has an actuating chamber and said pilot relay means has a positive feed back chamber interconnected to said actuating chamber.

32. A pneumatically operated control system as set forth in claim 31 wherein said feed back chamber of said pilot relay means is adapted to produce said pneumatic pilot output and terminate said pneumatic pilot output.

33. A pneumatically operated control system as set forth in claim 32 wherein said pilot relay means has valve means for interconnecting said feed back chamber to exhaust to terminate said pneumatic pilot output and for disconnecting said feed back chamber from said exhaust to create said pneumatic pilot output.

34. A pneumatically operated control system as set forth in claim 33 wherein said pilot relay is substantially snap acting when said valve means initially interconnects said feed back chamber to said exhaust.

35. A pneumatically operated control system as set forth in claim 33 wherein said source is interconnected to said feed back chamber through a restriction means.

36. A differential pressure operated pilot relay means comprising a housing means, said pilot relay means having means for sending a pneumatic pilot output when said pilot relay means receives a pneumatic signal of a certain magnitude, said pilot relay means having pneumatic means for selecting within limits the magnitude of said pneumatic signal that is required for said pilot relay means to produce said pneumatic pilot output, said pilot relay means having means for terminating said pneumatic pilot output when said pneumatic signal falls to another certain magnitude, said pilot relay means having means to cause said pilot relay means to be substantially snap acting when initially terminating said pneumatic pilot output.

37. A differential pressure operated pilot relay construction as set forth in claim 36 wherein said pilot relay means has a positive feed back chamber.

38. A differential pressure operated pilot relay construction as set forth in claim 37 wherein said feed back chamber of said pilot relay means is adapted to produce said pneumatic pilot output and terminate said pneumatic pilot output.

39. A differential pressure operated pilot relay construction as set forth in claim 38 wherein said pilot relay means has valve means for interconnecting said feed back chamber to exhaust to terminate said pneumatic pilot output and for disconnecting said feed back chamber from said exhaust to create said pneumatic pilot output.

40. A differential pressure operated pilot relay construction as set forth in claim 39 wherein said pilot relay is substantially snap acting when said valve means initially interconnects said feed back chamber to said exhaust.

* * * * *